June 11, 1968     A. GORDON     3,387,576
SEED PLANTER DEPTH REGULATOR
Filed April 22, 1965
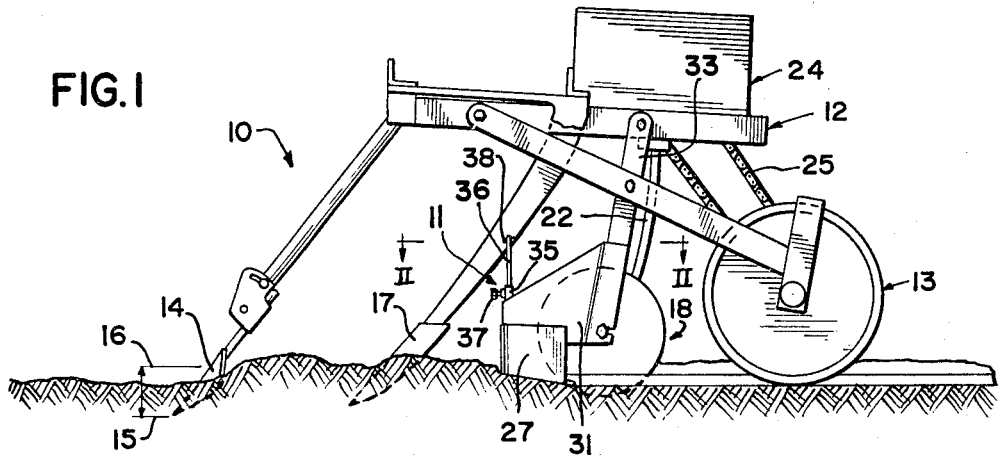
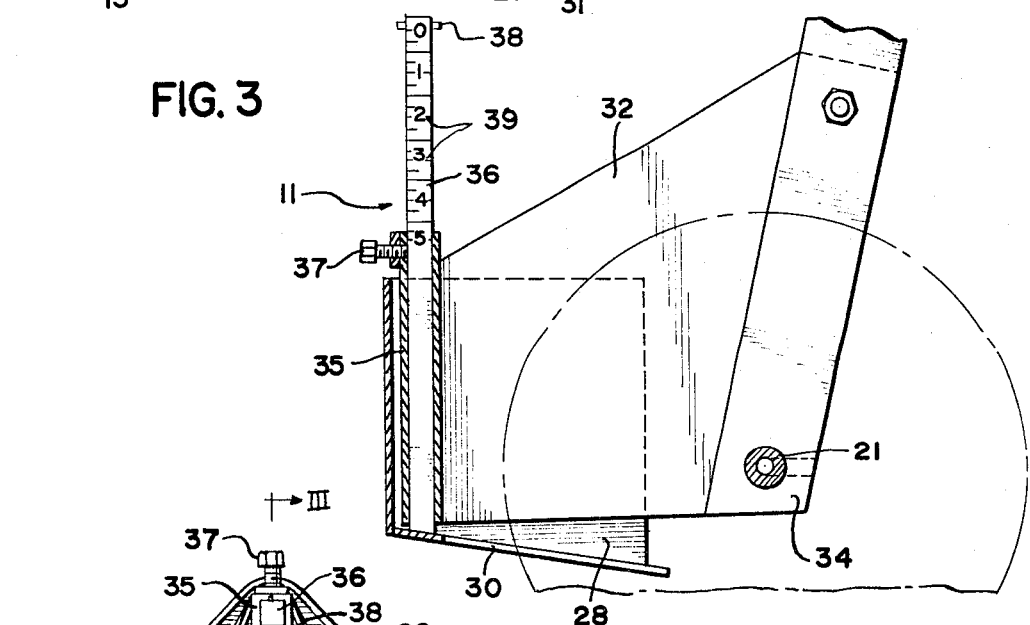
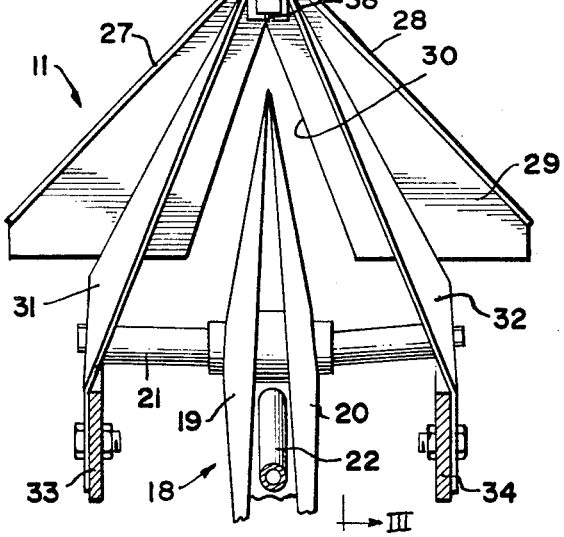
INVENTOR
ALVIN GORDON
BY *Alberts, Bregina & Lund*
ATTORNEYS United States Patent Office 3,387,576
Patented June 11, 1968

3,387,576
SEED PLANTER DEPTH REGULATOR
Alvin Gordon, 906 Cordele Road,
Sylvester, Ga. 31791
Filed Apr. 22, 1965, Ser. No. 450,024
4 Claims. (Cl. 111—85)

This invention relates to a seed planter and more particularly to a seed planter having a depth regulator operating in a manner such that a seed-receiving furrow is opened at a uniform depth irrespective of variations in terrain and soil conditions. The depth regulator is comparatively simple in construction and operation, can be readily adjusted to open a furrow of any desired depth within a wide range, and can be easily incorporated as a part of a seed planter being manufactured or attached to an existing seed planter. The regulator also functions to remove stones, hardened lumps or clods of soil or the like from the path of the furrow-forming means. It is further advantageous in that it can be used to impart a packing and firming action on soil partially pulverized by plow means operating ahead of the furrow-forming means.

The invention was evolved with the general object of overcoming the disadvantages of prior seed planters wherein the depth of planting varies widely with differing soil conditions and terrain, even with careful adjustment of the vertical position of furrow-forming means relative to the supporting wheel.

According to this invention, leveling means are supported from a seed planter frame in closely spaced relation ahead of furrow-forming means, the leveling means being arranged to smooth the soil to a level substantially constant relative to the furrow-forming means.

According to an important feature of the invention, the leveling means includes a pair of generally vertical walls converging to join at a forward edge in alignment ahead of the furrow-forming means, with the lower edges of the walls being at vertically fixed positions relative to the furrow-forming means, so as to level a path of substantial width with a furrow of uniform depth being opened in the middle of the path. The walls are further advantageous in that they move stones, hardened clods or lumps of soil and the like to either side of the path so formed, to insure further uniformity in the formation of the furrow.

A further important feature of the invention is in the provision of a downwardly facing relatively broad surface portion arranged for forming the path ahead of the furrow-forming means and for packing and firming the path to a substantially constant level. This feature is particularly advantageous in planting in relatively loose soil. The relatively broad surface may preferably be sloped or inclined downwardly and rearwardly at an angle such as to increase the packing and firming action.

According to a specific feature of the invention, the leveling means functions to form a path which is slightly rounded so that the center thereof is slightly higher than the sides thereof. This is accomplished by including the soil-engaging edge of the furrow-forming means downwardly and outwardly from a mid-point thereof.

Still another important feature of the invention relates to the positioning of the leveling means very closely ahead of the furrow-forming means in order to obtain maximum accuracy in the depth of the furrow. Specifically, with a furrow-forming means in the form of a pair of disks slanted to form a V, the soil-engaging edges of the leveling means extend from a point directly ahead of the forward edges of the disks outwardly and rearwardly to a point at a substantial distance behind the forward edges of the disks. Thus the aforementioned vertical walls may be positioned to receive the disks therebetween. The aforementioned relatively broad surface is preferably formed by a plate having a generally V-shaped notch cut therein to receive the disks.

Further features of the invention relate to the provision of means for accurately adjusting the vertical position of the leveling means to obtain the desired depth of furrow and to the provision of means for readily supporting the leveling means from the frame of a seed planter, to permit the leveling means to be incorporated as an integral part of the seed planter being manufactured, and to permit the leveling means to be readily attached to an existing seed planter.

This invention contemplates other and more specific objects, features and advantages which will become more fully apparent from the following detailed description taken in conjunction with the accompanying drawings which illustrate a preferred embodiment and in which:

FIGURE 1 is a side elevational view of a seed planter incorporating the depth regulator of this invention;

FIGURE 2 is a sectional view taken substantially along the line II—II of FIGURE 1, forming a top plan view of the depth regulator and furrow-forming disks of the seed planter; and FIGURE 3 is a sectional view taken substantially along the line III—III of FIGURE 2.

Reference numeral 10 generally designates a seed planter which incorporates a depth regulator device 11 constructed according to the principles of this invention.

In general, the seed planter 10 comprises a frame 12 to be drawn from a tractor and on which the wheel 13 is journaled for supporting the frame 12 for movement over soil. A plow 14 is supported from the frame 12 for producing a partially pulverized or loosened layer of soil, extending down to a lower level 15 and extending at least as high as an upper level 16, as diagrammatically indicated in FIGURE 1. One or more additional plows 17 may be supported from the frame 12, if desired.

The frame 12 also supports furrow-forming means 18 directly behind the plow 14. In the illustrated planter, the forming means 18 comprises a pair of disks 19 and 20 supported for rotation on angularly extending portions of a fixed generally horizontal shaft 21 which is bent at a central point, the disks 19 and 20 being journalled in slanted positions such that the forward edges thereof engage to form a V, while the rearward edges thereof are spaced apart. A seed-feeding tube 22 extends downwardly between the disks 19 and 20 from a planter device 24 supported on the frame 12. The device 24 may include a seed feeding and releasing mechanism driven through a chain 25 from a sprocket wheel driven by the wheel 13, operative to release seeds at regular intervals.

In accordance with this invention, the depth regulator 11 is supported from the frame 12 in closely spaced relation ahead of the furrow-forming means 18 and is arranged to smooth the soil to a level substantially constant relative to the furrow-forming means. In the preferred form of the regulator as illustrated, a pair of generally vertical walls 27 and 28 are provided which converge to join at a forward edge in alignment ahead of the furrow-forming disks 19 and 20. Such walls operate to smooth the soil to a level as determined by the vertical position of the lower edges thereof, and also are highly advantageous in that they move stones or rocks and lumps or clods of hardened soil to either side of the path of the furrow-forming means.

Preferably, and in accordance with a specific feature of the invention, the lower edges of the walls 27 and 28 are inclined downwardly and rearwardly in a manner such that the furrow is opened into the central part of a rounded surface which is higher than the side edges of the surface.

According to a further feature of the invention, the depth regulator 11 comprises a bottom plate 29 which provides a downwardly facing relatively broad surface for providing an additional smoothing action. Preferably, the plate 29 has converging forward edge portions which may be welded or otherwise secured to the lower edges of the walls 27 and 28. In addition, the plate 29 is preferably inclined downwardly as illustrated to additionally pack and firm the soil in the path through which the furrow is opened.

In order that the leveling action may take place closely ahead of the furrow-opening means, the bottom plate 29 is provided with a generally V-shaped notch 30 into which the forward end portions of the cutting disks 19 and 20 extend.

It is noted that the walls 27 and 28 could be used alone, without the bottom plate 29, and the depth regulating function can be performed solely by the lower edges of the vertical walls 27 and 28. In some cases, as for example in the case of sticky, muddy soil, the regulator will work better without the bottom plate 29, but in ordinary soil conditions, the bottom plate 29 is desirable in increasing the smoothing and firming action.

Important features of the invention relate to the support of the regulator 11 from the frame 12 in a manner such as to permit adjustment of the vertical position of the regulator relative to the furrow-forming means. In accordance with this feature, a pair of plates 31 and 32 are provided which have rearward edge portions bolted to a pair of frame members 33 and 34 which extend downwardly from the frame 12 in spaced parallel relation to support the ends of the shaft 21 on which the disks 19 and 20 are supported. The plates 31 and 32 converge to forward ends which are welded or otherwise secured to a vertical sleeve 35 of square cross-section. A square rod 36 is telescopically movable in the sleeve 35 and is welded or otherwise secured at its lower end to the center of the plate 29, directly ahead of the V-shaped notch 30. A set screw 37 is threaded into the wall of the sleeve 35 to engage the rod 36 and to lock the rod 36 in a desired position of vertical adjustment. A pin 38 may be provided in the upper end of the rod 36 to engage the upper end of the sleeve 35 and to limit downward movement of the rod 36.

According to a further feature, the rod 36 is provided with calibration marks 39 to indicate the vertical distance between the soil-engaging edges of the depth regulator and the bottom of the furrow-forming means, to thus indicate the approximate depth of planting of the seeds.

With this arrangement, the seeds can be accurately and uniformly planted to a desired depth, which can be readily adjusted. As the planter moves across the ground, the regulator itself cuts into the ground and clears away stones, lumps and debris and forms a smooth rounded surface into which the opening disks 19 and 20 make their cut. The depth of planting is not regulated by controlling the depth to which the cutting disks cut with relation to the original surface but rather by creating a new surface which is uniform with respect to the cutting disks, although not uniformly level. Without the depth regulator, a planter will cut unevenly on uneven ground and on ground varying as to hardness or softness while with the regulator, the cutting depth is uniform regardless of variations in the character of the ground. It will be understood that modifications and variations may be effected without departing from the spirit and scope of the novel concepts of this invention.

I claim as my invention:

1. In an attachment for a seed planter including a frame, means for supporting said frame for movement over soil and furrow-forming means on said frame for opening a furrow in the soil to receive seeds, leveling means supported from said frame and in closely spaced relation ahead of said furrow-forming means and including a pair of generally vertical walls converging to join at a forward vertically extending narrow corner in alignment ahead of said furrow-forming means and having lower edges inclined downwardly and rearwardly from the lower end of said corner, said walls being arranged to move rocks, clods and the like to either side of the path of said furrow-forming means, said leveling means further including a downwardly and rearwardly inclined bottom plate having converging side edges adjoining said downwardly and rearwardly inclined lower edges of said generally vertical converging walls to form sharp corners, and said bottom plate having a rearwardly opening notch extending from a point spaced from said narrow corner to define a flat smoothing portion behind said corner, and upwardly extending mounting means secured to the upper surface of said smoothing portion.

2. In an attachment for a seed planter as defined in claim 1, said furrow-opening means including a pair of discs journalled in slanted positions such that the forward edges thereof engage to form a V while the rearward edges thereof are spaced apart, and said rearwardly opening notch being a V-shaped notch into which the forward ends of said discs extend.

3. In an attachment for a seed planter as defined in claim 1, said upwardly extending mounting means including an upwardly extending rod, a sleeve telescopically receiving said rod, means for mounting said sleeve on said frame, and means for locking said rod in an adjusted position in said sleeve.

4. In an attachment for a seed planter as defined in claim 3, said rod and said sleeve having complementary polygonal cross-sections.

References Cited

UNITED STATES PATENTS

| | | | |
|---|---|---|---|
| 239,918 | 4/1881 | Bates | 172—430 |
| 411,696 | 9/1889 | Watson | 111—83 X |
| 742,872 | 11/1903 | Jacobs | 111—83 |
| 843,699 | 2/1907 | Reid | 111—85 X |
| 941,485 | 11/1909 | Anderson | 172—723 |
| 1,046,221 | 12/1912 | Rieske | 111—88 |
| 1,050,903 | 1/1913 | Anderson | 172—723 |
| 1,120,087 | 12/1914 | Roemer | 111—88 |
| 1,166,962 | 1/1916 | Altgelt | 172—575 |
| 1,175,544 | 3/1916 | Moore | 111—59 |
| 2,372,474 | 3/1945 | Cox | 172—199 X |
| 3,076,511 | 2/1963 | Johnson | 111—85 X |

ABRAHAM G. STONE, *Primary Examiner.*

ANTONIA F. GUIDA, *Examiner.*

A. E. KOPECKI, *Assistant Examiner.*